Patented Aug. 28, 1923.

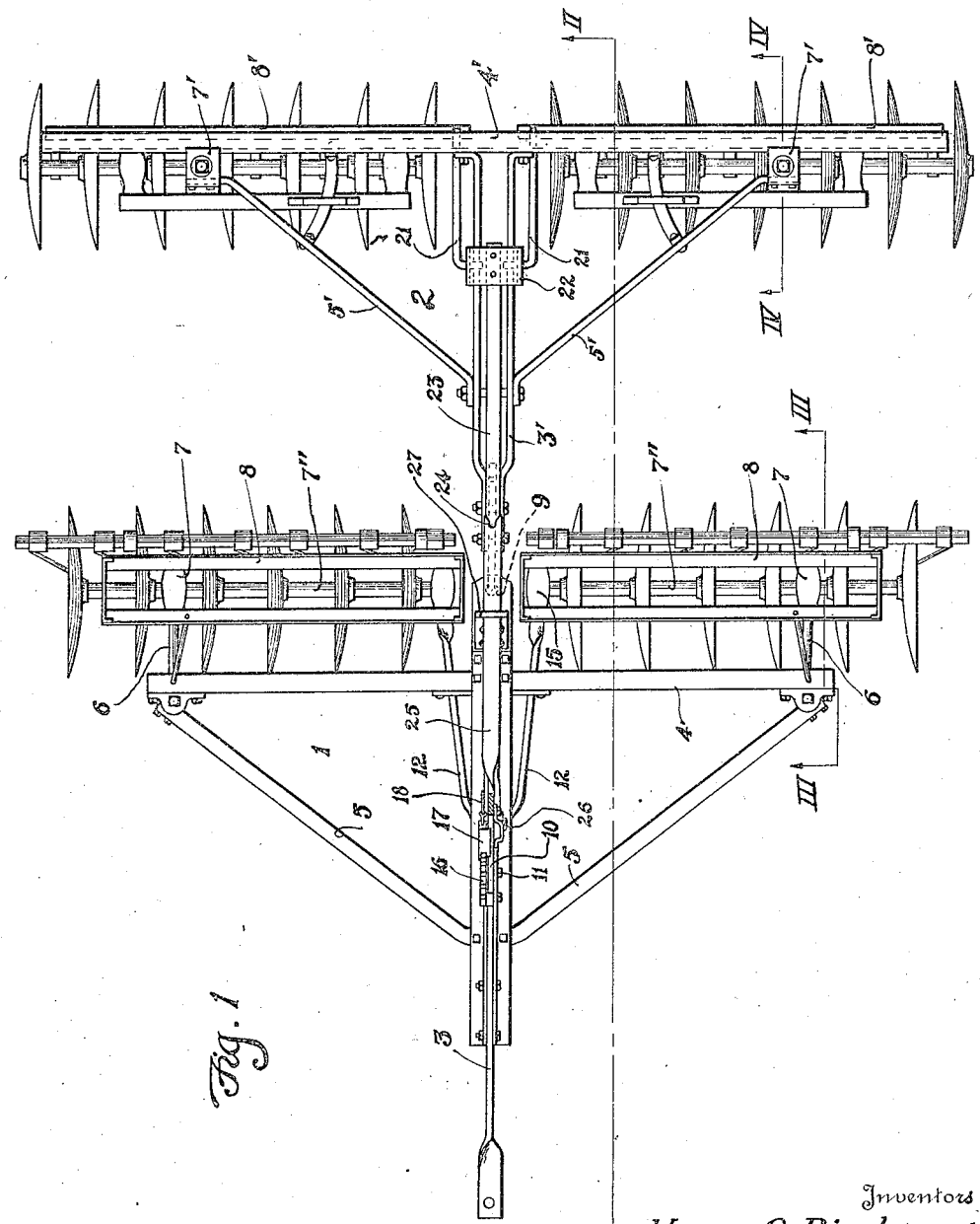

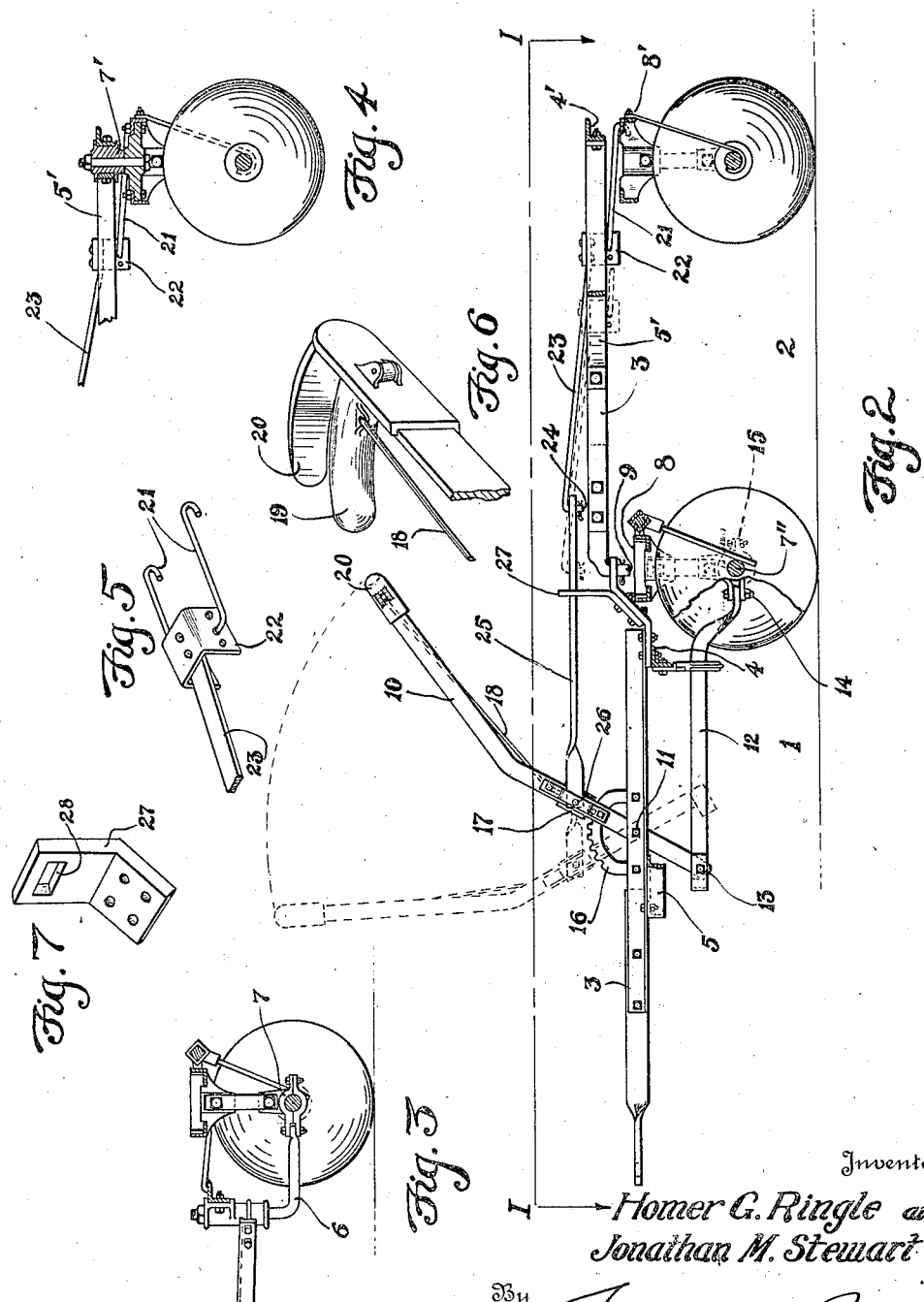

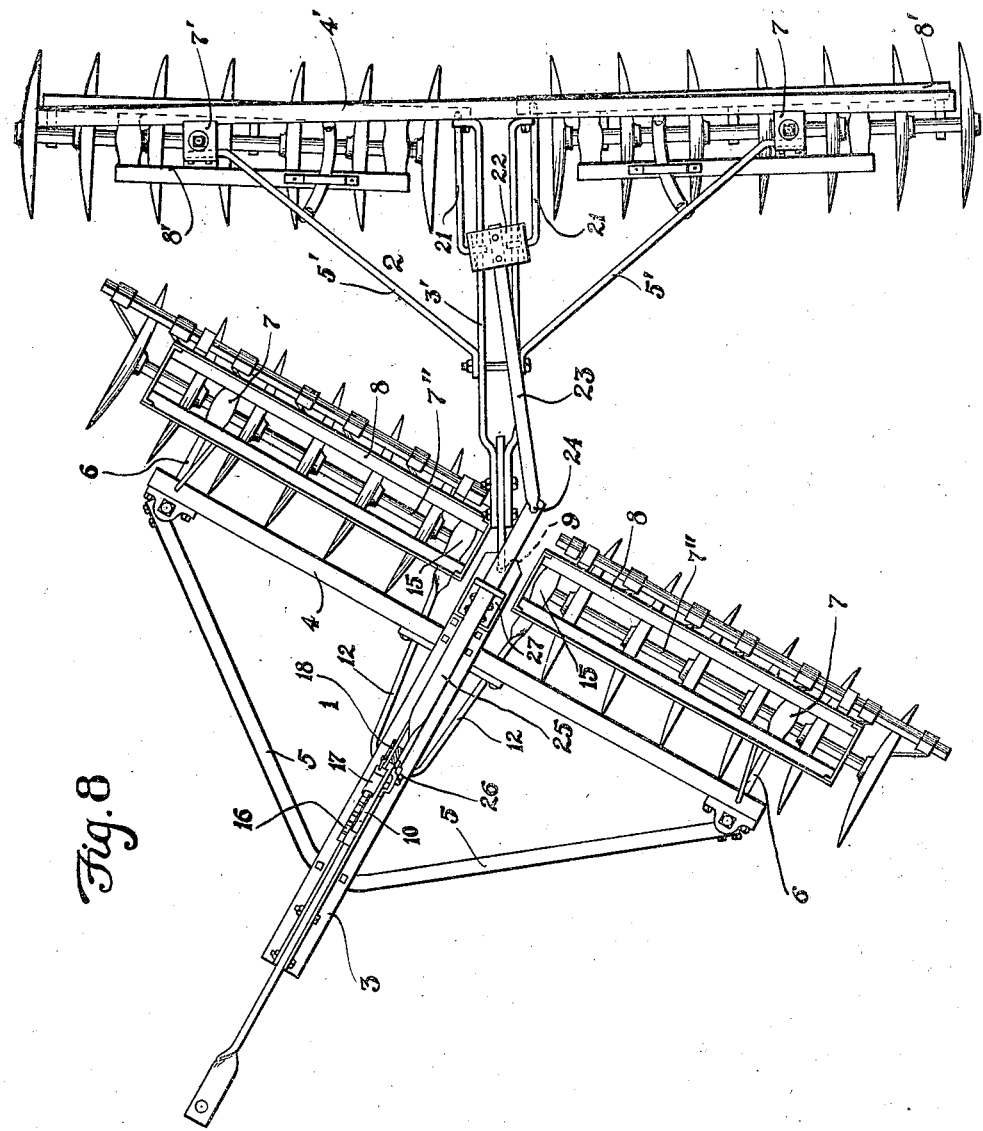

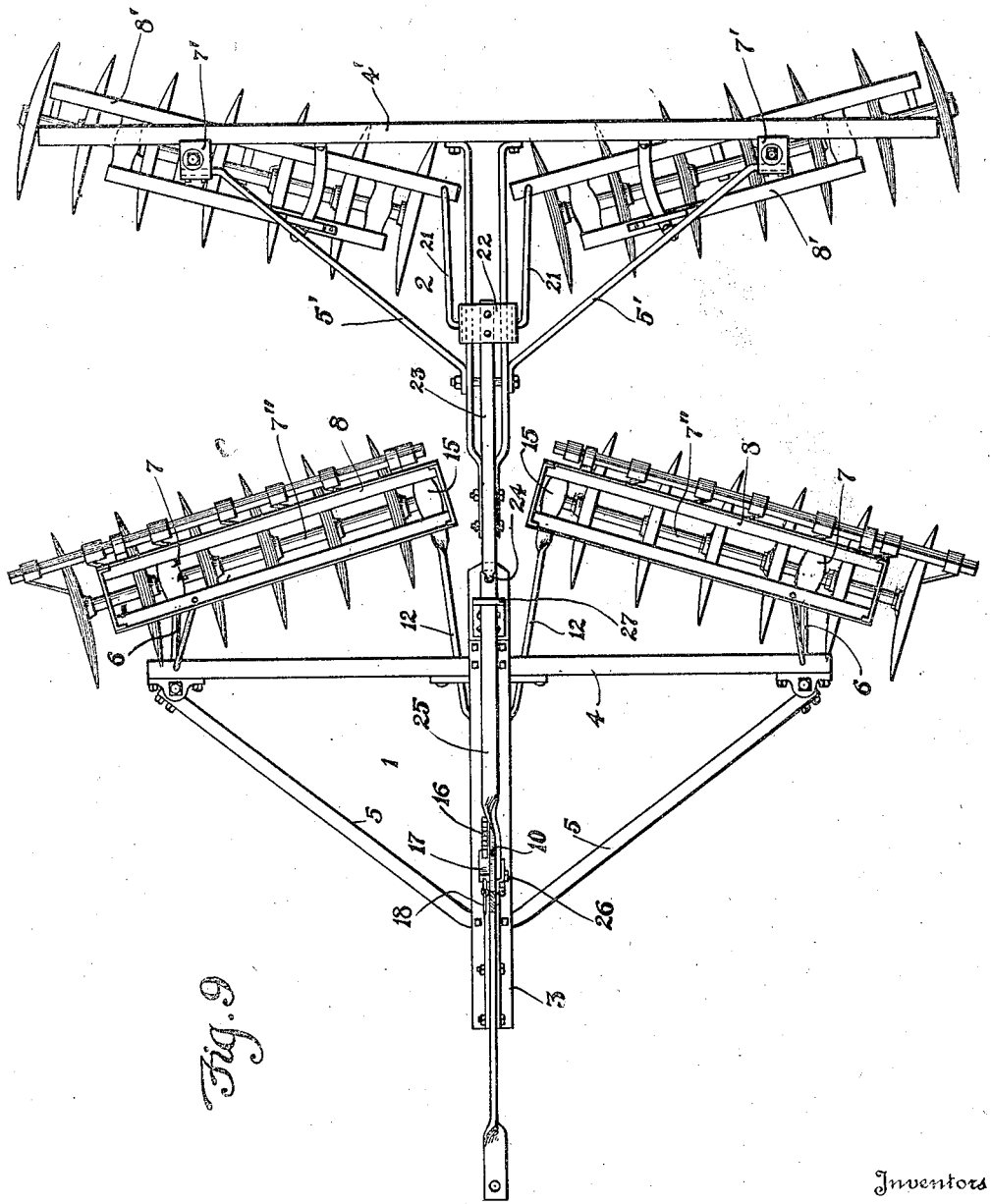

1,466,063

UNITED STATES PATENT OFFICE.

HOMER G. RINGLE AND JONATHAN M. STEWART, OF CANTON, OHIO, ASSIGNORS TO THE BUCHER AND GIBBS PLOW COMPANY, OF CANTON, OHIO, A CORPORATION OF OHIO.

DISK HARROW.

Application filed August 31, 1921. Serial No. 497,222.

*To the Commissioner of Patents:*

Be it known that we, HOMER G. RINGLE and JONATHAN M. STEWART, citizens of the United States, and residents of Canton, in the county of Stark and State of Ohio, have invented certain Improvements in Disk Harrows, of which the following is a specification.

The invention relates to double cut disk harrows; and the object of the improvement is to provide simple means, actuated by a single lever, for swinging the gangs to and from operative angles, while the machine is moving straight forward or is turning a corner.

A further object of the improvement is to embody the angling and straightening means for the respective gangs in a forward out-throw harrow and a rearward in-throw harrow, connected together by a single central pivot, so as to retain the features of construction which have become standard for the simpler harrows of this type; and to actuate the angling and straightening means by a single lever mounted on the forward draft bar within reach of the driver of a tractor, without changing the distance between the front and rear harrow frames.

The objects of the improvement are attained by swinging the forward gangs by links connected to the lower end of an upright lever fulcrumed on the forward draft bar, and swinging the rear gangs by links connected to a saddle slidably mounted on the rear draft bar; and by co-ordinating the swinging of all the gangs, by tandem bars between the lever and the saddle, having a vertical pivotal connection adjacent to the pivotal connection of the harrow, and the forward bar having a guide mounted on the forward draft bar.

A preferred embodiment of the invention is illustrated in the accompanying drawings, forming part hereof, in which—

Figure 1 is a plan view of the improved harrow, showing the gangs in parallel relation, and showing the lever in section on line I—I, Fig. 2;

Fig. 2, a side elevation section on line II—II, Fig. 1, showing in broken lines, the position of the lever swung forward for angling the gangs;

Fig. 3, a fragmentary section of the front harrow frame on line III—III, Fig. 1;

Fig. 4, a fragmentary section of the rear harrow frame on line IV—IV, Fig. 1;

Fig. 5, a fragmentary perspective view of the sliding saddle, showing the links and bar connected thereto;

Fig. 6, a fragmentary perspective view of the lever handle;

Fig. 7, a detached perspective view of the guide plate;

Fig. 8, a plan view of the improved harrow showing the gangs as in Fig. 1, with the frames angled for turning; and Fig. 9, a plan of the improved harrow showing the gangs angled and the frames parallel for straightway working.

Similar numerals refer to like parts throughout the drawings.

The forward out-throw harrow section 1 and the rear in-throw harrow section 2, are of usual construction, the forward harrow being provided with a frame comprising a draft bar 3, a cross bar 4, brace bars 5, and links 6 pivotally connected to the outer bearing 7 upon which the forward gangs 8 are swung to and from parallel relation; and the rear harrow being provided with a frame comprising a draft bar 3', a cross bar 4' and brace bars 5' connected directly with a bearing 7' forming a fulcrum upon which the rear gangs 8' are swung to and from parallel relation. The forward end of the rear draft bar 3' is centrally connected by a vertical pivot 9 to the rear end of the forward draft bar 3, so that the rear section can swing freely upon the forward section of the harrow.

The forward gangs are angled by a lever 10, pivoted at 11 to the forward draft bar 3, and by links 12 having their forward ends pivotally connected at 13 to the lower end of the lever, and their rear ends pivotally connected at 14 to the inner bearings 15 for the shaft 7 of the forward gangs; the lever being releasably held in a given position by means of the rack segment 16 mounted on the forward draft bar, and a spring detent 17 mounted on the lever and controlled by a connecting bar 18 and a pivoted handle 19 on the upper end of the lever adjacent to a fixed handle 20 thereon.

The inner ends of the rear gangs 8' are connected by links 21 to a saddle 22 slidably mounted on the rear draft bar 3', and to the saddle is connected the rear end of a rear tandem bar 23, which is connected at its forward end by a vertical pivot 24, to the rear end of the forward tandem bar 25, the forward end of which is pivotally connected at 26 to the lever 10, above its pivotal support. A guide plate 27 is secured to the rear end of the forward draft bar and is provided with a slot 28 for receiving and guiding the rear end portion of the forward tandem bar 25 as it slides endwise therein.

When the gangs are in parallel relation, the lever 10 is inclined rearward, and the pivotal connection of the tandem bars is located in rear of the pivotal connection of the draft bars, as shown in full lines in Fig. 1; and when it is desired to angle the gangs, the lever is pulled forward to the broken line position shown in Fig. 1, which draws the pivotal connection of the tandem bars forward to a point above the pivotal connection of the draft bar, as shown by broken lines in the same figure.

When the gangs are angled as shown in Fig. 9, and the pivotal connection of the tandem bars is substantially co-axial with the pivotal connection of the draft bars, it is evident that the forward section can be turned in either direction without affecting the relations of any of the parts; the guide plate 26 serving to hold the pivotal connection of the tandem bars co-axial with the pivotal connection of the draft bar.

When, however, the gangs are in parallel relation, as shown in Figs. 1, 2 and 8; a turning of the forward harrow section upon the draft bar pivotal connection, swings the tandem bar pivotal connection to one side or the other of the rear draft bar, as shown in Fig. 8. To accommodate this movement, the engagement of the sliding saddle 22 with the rear draft bar 3′ is made loose enough to permit the necessary lateral movement of the rear tandem bar; the resulting angling of the rear gangs being so slight as to be negligible, and the lateral displacement of the pivotal connection of the tandem bars, does not interfere with their endwise movement for swinging the gangs to and from parallel relation.

The harrow thus described, may be drawn by a tractor to which the forward end of the forward draft bar is connected; and the location of the actuating lever 10 permits it to be reached by the driver of the tractor for swinging all the gangs to and from parallel relation without stopping the machine, and while it is moving straight forward, as well as when it is making a turn.

We claim:—

1. A double cut disk harrow including tandem sections having swinging gangs and draft bars with a central swinging connection, operating means on the forward draft bar and connections for swinging the forward gangs, sliding means on the rear draft bar and connections for swinging the rear gangs, tandem bars between the operating and sliding means, having a swinging connection corresponding to the draft bar connection, and a guide for one of the tandem bars on the forward harrow section, whereby the angling means are associated directly with the draft structure.

2. A double cut disk harrow including tandem sections having swinging gangs and draft bars with a central pivotal connection, a lever on the forward draft bar and connections for swinging the forward gangs, a sliding saddle on the rear draft bar and connections for swinging the rear gangs, tandem bars between the lever and the saddle having a pivotal connection adjacent to the draft bar connection, and a guide for the forward tandem bar on the forward harrow section, whereby the angling means are associated directly with the draft structure.

HOMER G. RINGLE.
JONATHAN M. STEWART.